United States Patent [19]

Stiles

[11] 4,155,175
[45] May 22, 1979

[54] SIDING HANGING TOOL

[76] Inventor: Blair E. Stiles, R.D. 1, Box 242A, Homer City, Pa. 15748

[21] Appl. No.: 869,830

[22] Filed: Jan. 16, 1978

[51] Int. Cl.² ............................ G01B 3/30; G01B 5/16
[52] U.S. Cl. ....................................................... 33/187
[58] Field of Search ...................... 33/187, 188, 180 R

[56] References Cited

U.S. PATENT DOCUMENTS 424,173  3/1890  Brown ..................................... 33/187

Primary Examiner—Richard E. Aegerter
Assistant Examiner—Willis Little
Attorney, Agent, or Firm—Parmelee, Miller, Welsh & Kratz

[57] ABSTRACT

A tool for use in hanging siding, or the like, on a wall, the tool having a base member with a lip on the lower section for contact and alignment with a previously attached strip of siding, an outwardly and upwardly extending arm in the upper section for supporting a strip of siding in overlapping relation to the previously attached strip, and means for detachable securement of the tool to the wall, such as a hole adjacent the terminus of the upper section through which a spike is passed.

3 Claims, 5 Drawing Figures

SIDING HANGING TOOL

BACKGROUND OF THE INVENTION

The present invention relates to a tool for use in attaching siding, or the like, to a wall of a building. In the attachment of strips of siding, generally, a lowermost strip of siding is attached to the wall and layers of siding are then applied with a portion of upper strips overlapping each succeeding lower strip. These strips may vary in size but normally, long horizontal strips are used, and the alignment and temporary placement of the strips requires the presence of a worker and an assistant.

Tools for use in hanging siding, so as to enable use of a singler worker without the need of an assistant, have been proposed but such tools are of complex design and, with moving parts, are subject to damage or breakage. Such tools are, for example, described in U.S. Pat. Nos. 3,904,184 and 3,490,152. In U.S. Pat. No. 3,904,184, a tool is described which has a pivoting mechanism in the head of the tool, which tool must be aligned by lateral positioning by either marking the wall or using the eye of the worker. The strip of siding that is to be applied must then be slid upwardly beneath the tool for support by a hook or step. During such sliding, marring of the surface of the previously attached strip or of the strip that is to be attached could occur, and the wear of biasing means used to control the pivoting of the arm could result in slippage or damage of the strip. In U.S. Pat. No. 3,490,152, a much more complex tool is described where a clamping mechanism is used to support the tool frame on an already attached strip or the wall, with the problem of marring of the strip or slippage of the tool present, unless specific tolerances and forces would be used.

The tool of the present invention provides means for hanging siding by a single worker and does not have any complex mechanism that may eventually fail under extensive use. Also, the tool provides for ready alignment of strips of siding and does not require clamping or other force on the already attached strip and precludes problems of marring of either previously attached strips or strips to be attached to the wall structure.

BRIEF DESCRIPTION OF THE INVENTION

A tool for use in hanging siding comprises a base portion that has upper and lower sections interconnected to form an obtuse angle. The lower section has an outwardly extending lip at the bottom thereof for contact with a strip of siding already attached to a building to align the tool and the next strip of siding to be applied. The upper section has an outwardly and upwardly extending arm which provides a pocket for supporting the strip of siding that is to be attached to the building with the lower edge of said strip overlapping the previously attached strip. The tool is easily releasably secured to the building by means of a nail passing through a hole in the upper section of the tool and the tool is readily removed, upon attachment of a strip to the building, by sliding the tool downwardly so that it may be ready for further use.

DESCRIPTION OF THE PREFERRED EMBODIMENT

The present invention comprises a tool for use in hanging siding, metallic or otherwise, on a building wherever upper strips of siding are superimposed to an extent over a lower strip of siding and which tool enables the alignment and attachment of long strips of siding to a building by a single worker without the need of an assistant.

Figure 1:
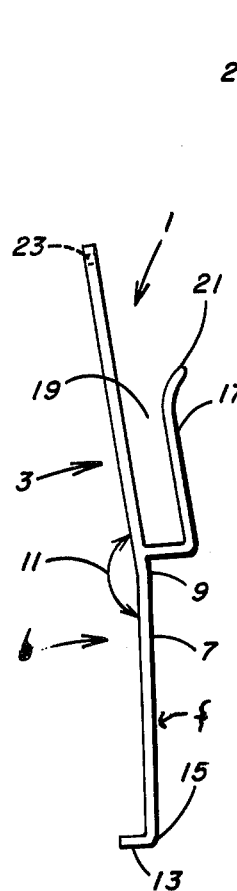
FIG. 1 is a side elevational view of the tool for hanging siding of the present invention.

Referring to FIG. 1, there is illustrated a tool 1, for use in hanging siding which has a base member 3. The base member 3 has a front f and back b and is formed of two sections, an upper section 5 and lower section 7, which sections are interconnected at 9. The sections are so interconnected that the upper section 5 and a lower section 7, at the back b thereof forms an obtuse angle 11. The lower section of the base member 3, has on the back thereof, an outwardly extending lip 13 adjacent the terminus 15 of the lower section, the purpose of which is to contact the lower edge of a strip of siding previously attached to the building to enable alignment of the strip that is to be next attached to the building.

On the front of the section 5 of the base member 3, there is provided an outwardly and upwardly extending arm 17, the arm located adjacent the interconnection 9 between the upper section 5 and lower section 7 of the base member. This outwardly and upwardly extending arm 17 forms, with the base member 3 a pocket 19 into which a piece of siding may be placed and supported when the tool is in use as hereinafter explained. The arm 17, as illustrated, may terminate in a rounded outwardly directed portion 21 for safety and protective purposes. The upper section 5 has adjacent to the terminus thereof, a slot or hole 23 to enable passage of a nail through the base member for releasably securing the tool to a building.

The tool 1 is of integral construction and may be formed of various materials of sufficient strength to withstand field use. The tool may, for example, be formed of metal, preferably with a plastic or rubbery coating thereover so as to protect the decorative facing of strips of siding. Or, alternatively, the tool may be molded or otherwise formed from a plastic material, such as a nylon or polyester material, which would have sufficient rigidity and smooth, non-marring surface.

Figure 2:
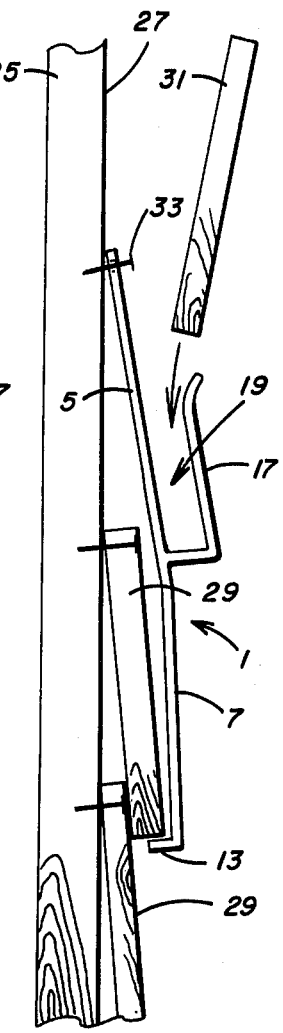
FIG. 2 is side elevational view of the tool when releasably secured to a building at the start of hanging a strip of siding.
Figure 3:
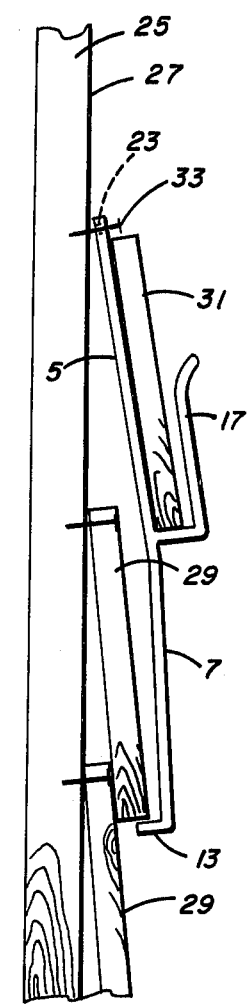
FIG. 3 is a side elevational view of the tool when releasably secured to a building with a strip of siding supported thereby for attachment to the building.
Figure 4:
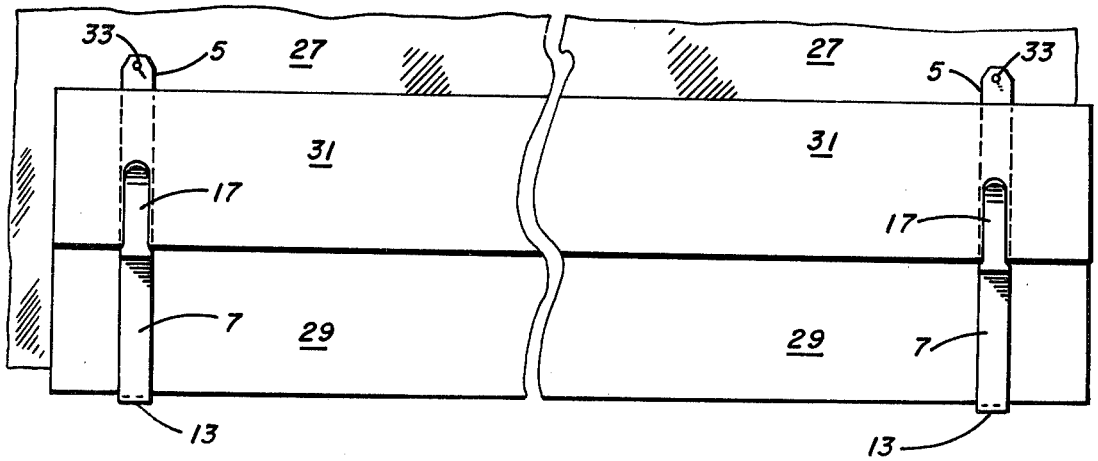
FIG. 4 is a perspective view of a building showing a pair of tools in use for hanging siding.

In the use of the tool, the lowermost strip of siding is attached to the wall of a building in a conventional manner. Referring to FIG. 2, a building 25 is shown having a surface 27 which is to be covered with siding. Strips of siding 29 are shown which have been previously attached to the surface 27 and the tool 1 is illustrated in position for attachment of a further sheet of siding 31 which is to be attached to surface 27 with a portion thereof overlapping the uppermost attached strip 29. To provide alignment of the new strip, the lip 13 of the tool 1 is placed in contact with the lower edge of the previously attached sheet 29 and a nail or spike 33 is driven through the hole 23 to releasably secure the tool 1 to the building 25. The lower section 7 of the base member 3 will be superimposed over the uppermost attached strip 29, as will a portion of the upper section 5 so that placement of the new strip 31 into the pocket 19 formed by the outwardly and upwardly extending arm 17 will result in the lower edge of the new strip 31 overlapping the uppermost strip 29. This alignment is shown in FIG. 2 where placement of a strip 31 into the pocket 19 is shown and also in FIG. 3 wherein the actual seating of the strip 31 into the pocket 19 is shown. Also, in FIG. 4, wherein the use of two of the tools 1 is illustrated, the overlapping of the new strip 31 is effected with the sheet 31 aligned and supported while the worker can then secure the strip 31 to the building by the conventional use of nails or other attachment means.

Figure 5:
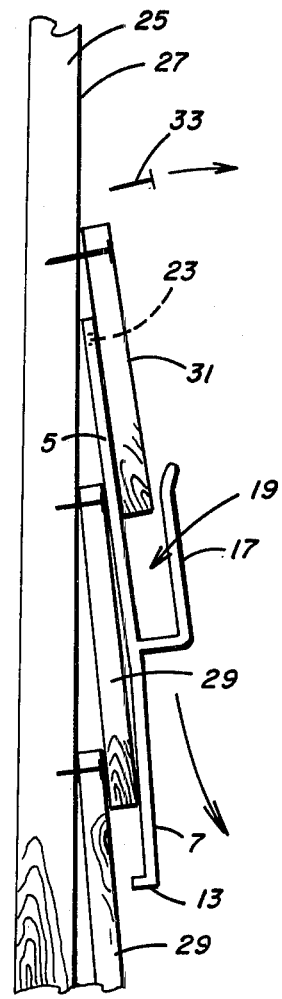
FIG. 5 is a side elevational view showing removal of the tool from securement to the building after a piece of siding supported thereby has been attached to the building.

After the new strip 31 of the siding has been secured sufficiently to prevent slippage of falling of the strip, the tool 1 is removed for use in applying the next sheet. As shown in FIG. 5, the detachment and removal of the tool is easily achieved merely by pulling out the nail 33 and sliding the tool downwardly from between the overlap of strip 31 and uppermost strip 29 of the siding.

I claim:

1. A tool for use in hanging siding on a building comprising an integral base portion having a front and back side with a smooth and non-marring, respective front and back surface and formed of upper and lower sections, interconnected such that an obtuse angle is formed at said back side between said upper and lower sections, said lower section having on the back side an integral outwardly extending lip adjacent the terminus thereof for contact with the lower edge of siding previously secured to the building, said upper section having on the front side thereof adjacent said interconnection an integral outwardly and upwardly extending arm forming a pocket therewith for supporting siding to be affixed to the building whereby the angular configuration of said base portion prevents marring of the previously secured siding and enables removal of the tool by sliding the same downwardly between said previously secured siding and the siding upported by said pocket, and means adjacent the terminus of said upper section for detachable securement of said tool to the building.

2. A tool for use in hanging siding as defined in claim 1 wherein said means for detachable securement of the tool to the building comprises an upper section having a hole therethrough through which a nail will pass for detachable securement of the tool to the building.

3. A tool for use in hanging siding as defined in claim 1 wherein said arm terminates in an outwardly directed portion.

* * * * *